United States Patent Office 3,094,392
Patented June 18, 1963

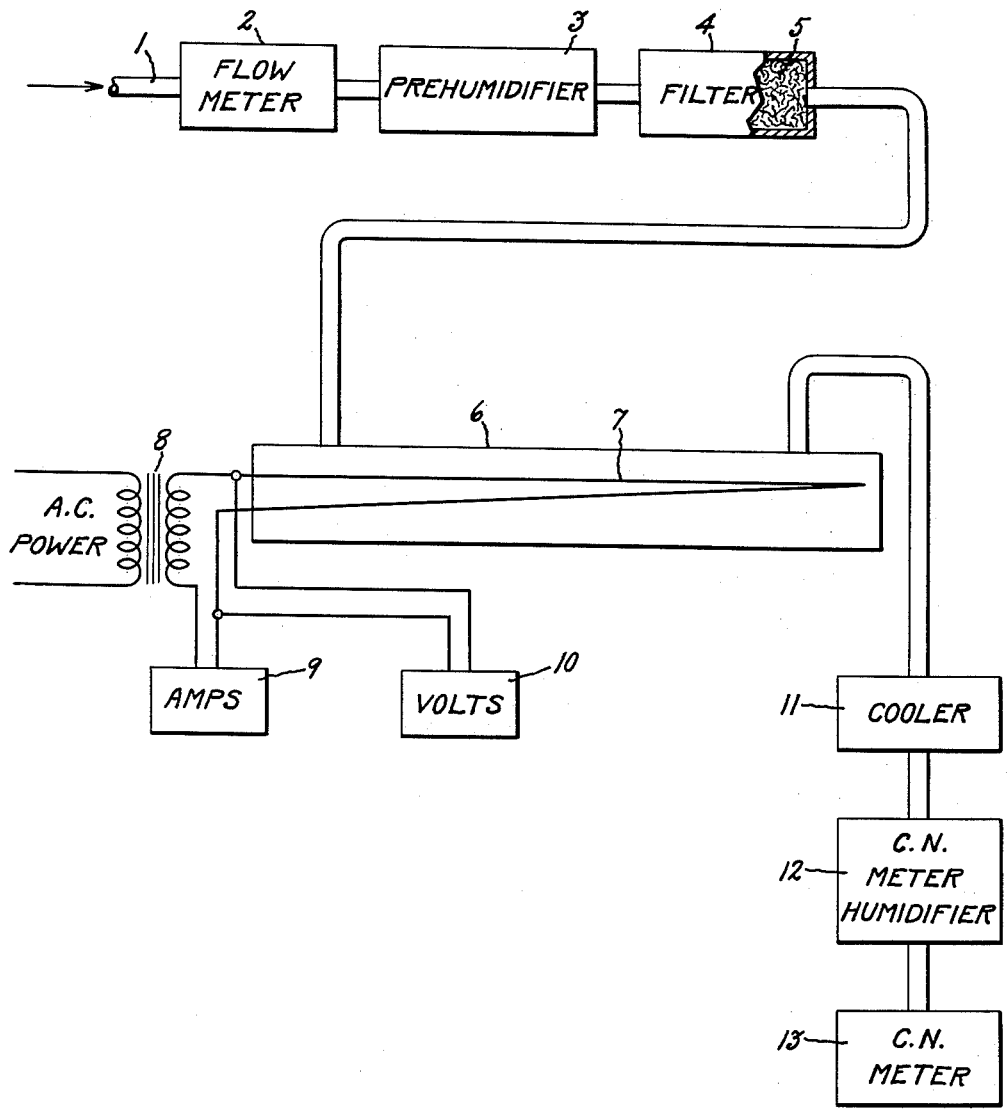

3,094,392
GAS DETECTION
George F. Skala, Scotia, N.Y., assignor to General Electric Company, a corporation of New York
Filed Nov. 15, 1960, Ser. No. 69,419
4 Claims. (Cl. 23—232)

This invention relates to a method and apparatus for measuring and detecting certain inorganic vapors and gases, and more particularly, for detecting minor concentrations of sulfur-halides by converting the same into condensation nuclei, the concentration of which is measured as an indication of the gas or vapor concentration.

The term "pyrolysis," as utilized in the instant application, is intended, to cover the conversion of an inorganic compound, sulfur-hexafluoride ($SF_6$) in the presence of heat and an oxidizing atmosphere into the form of gaseous sulfur oxidation products such as sulfur dioxide and sulfur trioxide.

Infrared spectroscopy, spectrophotometry, X-ray absorption, mass spectrometry, and numerous other techniques have been used in the past to detect and measure inorganic vapors and gases. Nevertheless, all are troubled by one or more shortcomings, such as lack of sensitivity, lack of speed, and have required complex and expensive equipment. For these and other reasons a need has long existed for an instrument which is accurate, sensitive, of simple construction, and inexpensive to manufacture.

Recent investigations have led to an extremely sensitive method for detecting inorganic gases and vapors which is based on the conversion of the gas or vapor to airborne particulates of the condensation nuclei type and the subsequent measurement of the nuclei concentration by means of known condensation nuclei measuring techniques.

The term "condensation nuclei," as utilized in this specification, is a generic name given to those small airborne particles which are characterized by the fact that they serve as a nuclei on which a fluid such as water, for example, condenses to form droplets. The condensation nuclei, as understood in the art, encompasses particles ranging in size from $1 \times 10^{-4}$ centimeter radius to $1 \times 10^{-8}$ centimeter radius although the most significant portion numerically of this range lies between $5 \times 10^{-5}$ and $5 \times 10^{-7}$ cm. radius.

It is an object of this invention, therefore, to provide a method and apparatus for the improved detection and measurement of sulfur-halide gases and vapors by means of pyrolytic conversion and hydrolytic conversion.

It is another object of this invention to provide an improved method and apparatus for detecting and measuring minor concentrations of sulfur-halides, particularly sulfur-hexafluoride.

Other objects and advantages of the invention will become apparent as the description thereof proceeds.

The foregoing objects and advantages of this invention are accomplished and the invention practiced by passing a gas stream containing the sulfur-halide gas or vapor through a pyrolytic chamber preferably having an electrically heated wire. The conversion in the pyrolytic chamber is enhanced or improved by passing the gas stream through a prehumidifier. The action of the heated wire is to convert the inorganic vapor or gas into gaseous sulfur oxidation products, that are converted in a humidifier by hydrolysis into the form that exists as condensation nuclei. The nuclei are then measured by a condensation nuclei meter that is directly calibrated to provide the indication of the sulfur-halide concentration.

The features of this invention which are believed to be novel are set forth with particularity in the appended claims.

The invention itself, however, both as to its organization and method of operation, together with further objects and advantages thereof may best be understood by reference to the following description taken in connection with the accompanying drawing in which the FIGURE is a schematic illustration of a device for detecting and measuring sulfur-hexafluoride.

An apparatus for practicing the invention in a preferred embodiment is illustrated generally in the drawing and comprises an instrumentality by means of which sulfur-hexafluoride gas or vapor, is first converted by the application of a heated wire under controlled conditions in a chamber forming the gaseous sulfur dioxide and sulfur trioxide that is converted further in a humidifier by hydrolysis into sulfuric acid which exists as small condensation nuclei. To this end, a sample atmosphere or gaseous stream containing, or suspected of containing, the sulfur-hexafluoride gas or vapor is introduced through an input conduit 1 to flow meter, indicated generally at 2, and to be described in further detail later, to determine the gas flow velocity, a parameter which is of importance in calibrating the instrument. The gas stream then enters a prehumidifier 3 whose purpose is to improve the chemical reaction subsequently occurring in a pyrolytic chamber to be hereinafter more fully described. The gas stream then enters a filter 4 in which all ambient airborne particles are removed. Filter 4 preferably is filled with a fibrous material 5 which removes substantially all such particles without removing the sulfur-hexafluoride which is in gaseous or vapor form. In this manner, all subsequently measured condensation nuclei result from the conversion of the sulfur-hexafluoride gas or vapor and are not due to ambient background particles. The filtered and humidified gas stream is then passed to a converter unit or pyrolytic chamber 6. A platinum wire 7 in chamber 6 is connected across a step-down transformer 8, energized from an A.C. power source as shown. Ammeter 9 and voltmeter 10 are connected to wire 7 and provide measurements for controlling power released in form of heat. The sulfur-hexafluoride gas or vapor in the gas stream is converted to gaseous sulfur dioxide and sulfur trioxide in passing through chamber 6 in the presence of heated platinum wire 7. The effect of prehumidifier 3 is to improve pyrolytic conversion of the sulfur-hexafluoride. While the exact manner in which the prehumidifier effects this conversion is not fully understood at this time, an operational theory is set forth in detail later. It is sufficient to state at this point that it has been found that the prehumidifier before the chamber aids the conversion of the sulfur-hexafluoride, whereas the gas stream without prehumidification does not produce satisfactory conversion. The gaseous sulfur dioxide and sulfur trioxide in the gas stream upon leaving chamber 6 is passed through water bath cooler 11 and temperature of the gas is reduced to a level such that it can be safely passed to a condensation meter 13. Prior to entering meter 13 the gas stream passes through a condensation nuclei meter humidifier 12 to effect the hydrolytic conversion reaction of gaseous or vapor sulfur dioxide and sulfur trioxide to sulfuric acid ($H_2SO_4$) which exists as condensation nuclei.

The nuclei formed by two successive conversions described above are brought to the condensation nuclei measuring device 13 wherein the nuclei are measured to provide an indication of the sulfur-hexafluoride gas or vapor concentration. Condensation nuclei measuring device may be one of several well known types that utilize a humidifying device to bring the nuclei particle bearing gaseous stream to 100% relative humidity to effect the hydrolytic conversion reaction. In such device 13 the humidified sample is subjected to an adiabatic expansion which cools the gas and produces a controlled degree of supersaturation. A supersaturated condition is, of course, an unstable one so that the excess water vapor condenses on the condensation nuclei to form droplets which grow rapidly in size and abstract sufficient water vapor to reduce the supersaturated level to 100% humidity at the new temperature. The droplet clouds thus formed on the condensation nuclei are measured by means of an electro-optical system which includes a light projection system for projecting a beam of light which is scattered by the droplets to a degree determined by the droplet density. A photosensitive device intercepts the scattered light and produces an output current, which current may be directly calibrated in parts per million (p.p.m.) of the gas or vapor. A condensation nuclei measuring device similar to this is described in U.S. Patent No. 2,684,008, issued July 20, 1954, to Bernard Vonnegut. Another suitable condensation nuclei measuring device is described in an article entitled "Cloud Chamber for Counting Nuclei in Aerosols," by Bernard G. Saunders, in Review of Scientific Instruments, vol. 27, No. 5, May 1956, pages 273–277. In the condensation nuclei measuring device described in the Saunders article, periodically actuated solenoid valves control the admission of the humidified aerosol in the device and its subsequent expansion to form the droplet cloud. The droplet cloud measured either photographically or electro-optically provides an indication which is a measure of the condensation nuclei. In addition to these devices it will be understood by those skilled in the art that many other and different types of nuclei measuring devices may be used for the gas detecting and measuring purposes described in the instant application.

While it is not intended that the scope of the invention be limited by any particular theory of operation, it is believed that the first conversion is based on the following mechanism which takes place when the sample atmosphere or gas stream is exposed to electrically heated platinum wire 7 in pyrolytic chamber 6. Under the action of controlled heated wire 7 it is believed that the principal reaction is one of disassociation of the sulfurhexafluoride, followed by oxidation of the sulfur to gaseous sulfur dioxide ($SO_2$) and sulfur trioxide ($SO_3$). As mentioned previously, prehumidifier 3 has an important bearing on the chemical reaction within chamber 6. It was found that in experimental results to be mentioned below that without prehumidification of the gas stream the dry gas formed a film on the heated wire 7 that prevented within time the conversion of sulfur-hexafluoride by disassociation to gaseous sulfur dioxide and sulfur trioxide. Therefore, it is believed that the effect of prehumidifier 3 is to prevent the formation of film on wire 7 and termination of the disassociation reaction. The products of the pyrolytic conversion, gaseous sulfur dioxide and sulfur trioxide, are converted by hydrolytic humidifier 12 to sulfuric acid which has a low enough vapor pressure so that the molecules conglomerate into condensation nuclei and may be measured in conventional condensation nuclei devices such as those described above.

In order to establish the validity of this method of converting sulfur-hexafluoride gas or vapor by the two conversions of pyrolysis and hydrolysis, an instrumentality such as that illustrated in the drawing was assembled. Average wire temperature was maintained at 900° C. through indications of ammeter 9 and voltmeter 10. When, in the absence of prehumidifier 3, the gas enters pyrolytic chamber 6 in dry form, a transient response was obtained. This however lasted for only a few minutes after which the response was reduced and the instrument lost its sensitivity. The transient response appeared to result from a film formed on wire 7. In one instance the sensitivity had been lost by operating without prehumidifier 3, but was regained by inserting the pehumidifier and applying a high concentration of the sulfur-hexafluoride. With prehumidifier 3 in place, continued and stable response to sulfur-hexafluoride was obtained. At an input of twenty parts per million (p.p.m.) of sulfur-hexafluoride the nuclei count was $200 \times 10^3$ nuclei per cubic centimeter against a zero signal level of $16 \times 10^3$ nuclei per cubic centimeter on a condensation nuclei meter. With this sensitivity a detection capability of 1 part per million (p.p.m.) or less is possible. It can be seen, therefore, that the employment of the first conversion in pyrolytic chamber 6 using a controlled heated platinum wire 7 in the gas stream bearing sulfur-hexafluoride vapor or gas and of the second conversion in hydrolytic humidifier 12 to sulfuric acid produces an extremely sensitive instrumentality.

One satisfactory means for conducting the calibration of the instrument can be described for sulfur-hexafluoride. To this end flow meter 2 has conduit means (not shown) for admitting separate samples of the carrier gas and sulfur-hexafluoride gas with which to conduct an input calibration. A flask containing water (also not shown) is connected to the sulfur-hexafluoride conduit means within flow meter 2. The sulfur-hexafluoride is bubbled through the water in the flask permitting visual observance of the volume flow rate of the gas or vapor. This observation provides an accurate estimate of the gas flow in cubic centimeters per second. The carrier gas is also admitted to the instrument through its separate conduit; and its volume flow rate is determined by condensation nuclei meter 13. The ratio of the sulfur-hexafluoride flow rate and carrier gas flow rate is the input in parts per million of the sulfur-hexafluoride to the carrier gas. An indication of the sensitivity of the instrument is clearly evident from the results described previously. In this manner a satisfactory measurement of the sulfur-hexafluoride can be obtained that is accurate and sensitive. It will be realized that for each gas or vapor having an input calibration in parts per million (p.p.m.), condensation nuclei meter 13 will have a different reading in nuclei per cubic centimeters.

It is to be understood that the present invention is not to be limited to detection of $SF_6$ shown in the above preferred embodiment. For example, other sulfur-halide compounds existing as a gas or vapor under ordinary conditions can be detected in the same manner as described, including sulfur tetrachloride ($SCl_4$) and sulfur monofluoride ($S_2F_2$). It is also believed that volatile sulfur-halide liquids and solids having sufficient vapor pressures to exist partially as a gas or vapor at ordinary conditions can be detected by the present described means.

From the foregoing it is apparent that a novel, simple, and highly sensitive instrumentality for detecting minor concentrations of sulfur-halide vapor or gas have been provided and constitutes a valuable and substantial contribution in the art.

While a particular embodiment of this invention has been shown, it will, of course, be understood that it is not limited thereto, since many modifications, both in the circuit arrangements and in the instrumentality employed, may be made. It is contemplated by the appended claims to cover any such modifications as fall within the true spirit and scope of this invention.

What I claim as new and desire to secure by Letters Patent of the United States is:

1. The method of detecting the presence of a sulfur-halide gas or vapor in a gas stream which comprises prehumidifying the gas stream, filtering the gas stream to remove ambient airborne particles, disassociating the sulfur-halide gas or vapor by pyrolysis in an oxidizing atmosphere to form gaseous sulfur oxidation products, hydrolyzing the sulfur oxidation products to form condensation nuclei and measuring the concentration of the nuclei.

2. The method of detecting the presence of a sulfur-hexafluoride gas or vapor in a gas stream which comprises prehumidifying the gas stream, filtering the gas stream to remove ambient airborne particles, disassociating the sulfur-hexafluoride gas or vapor to gaseous sulfur dioxide and sulfur trioxide, hydrolyzing the sulfur dioxide and sulfur trioxide to form condensation nuclei and measuring the concentration of the nuclei.

3. An apparatus for detecting the presence of sulfur-halide gas or vapor in an atmosphere which comprises the combination of means for establishing a flow of the atmosphere in the apparatus, a first enclosed chamber having means for humidifying the atmosphere in the chamber, filter means associated with the first enclosed chamber for removing ambient airborne particles from the atmosphere, a second enclosed chamber having means for disassociating the sulfur-halide gas or vapor in the presence of an oxidizing atmosphere in the chamber to form gaseous sulfur oxidation products, a third enclosed chamber having means for hydrolyzing the sulfur oxidation products to form condensation nuclei, said chambers being interconnected by gas passage means, and optical means for measuring the concentration of such nuclei.

4. An apparatus for detecting the presence of sulfur-halide gas or vapor in an atmosphere which comprises the combination of means for establishing a flow of the atmosphere in the apparatus, a first enclosed chamber having means for humidifying the atmosphere in the chamber, filter means associated with the first enclosed chamber for removing ambient airborne particles from the atmosphere, a second enclosed chamber having heating means for disassociating the sulfur-halide gas or vapor in the presence of an oxidizing atmosphere in the chamber to form gaseous sulfur oxidation products, a third enclosed chamber having means for hydrolyzing the sulfur oxidation products to form condensation nuclei, said chambers being interconnected by gas passage means, and a condensation nuclei meter for measuring the concentration of the nuclei in the atmosphere by optical light-scattering means which includes means for adiabatically expanding the atmosphere to produce supersaturation and condense water vapor on the nuclei thereby forming a cloud of droplets in the atmosphere.

References Cited in the file of this patent

UNITED STATES PATENTS

| | | |
|---|---|---|
| 2,136,741 | Henne | Nov. 5, 1938 |
| 2,774,652 | Vonnegut | Dec. 18, 1956 |

FOREIGN PATENTS

| | | |
|---|---|---|
| 355,131 | Italy | Dec. 20, 1937 |

OTHER REFERENCES

Jacobson: "Encyclopedia of Chemical Reactions," pages 47, 65, 71 and 73, volume VII, Reinhold Publ. Co., N.Y., 1958.